(12) United States Patent
Lundstrom

(10) Patent No.: US 11,603,930 B2
(45) Date of Patent: Mar. 14, 2023

(54) MECHANICAL JOINT GASKET WITH PROTRUSIONS

(71) Applicant: EBAA Iron, Inc., Eastland, TX (US)

(72) Inventor: Michael L. Lundstrom, Eastland, TX (US)

(73) Assignee: EBAA IRON, INC., Eastland, TX (US)

( * ) Notice: Subject to any disclaimer, the term of this patent is extended or adjusted under 35 U.S.C. 154(b) by 67 days.

(21) Appl. No.: 17/378,161

(22) Filed: Jul. 16, 2021

(65) Prior Publication Data

US 2022/0018436 A1    Jan. 20, 2022

Related U.S. Application Data

(60) Provisional application No. 63/053,240, filed on Jul. 17, 2020.

(51) Int. Cl.
*F16J 15/08*    (2006.01)

(52) U.S. Cl.
CPC ................. *F16J 15/0818* (2013.01)

(58) Field of Classification Search
CPC .......... F16J 15/02; F16J 15/021; F16J 15/022; F16J 15/06; F16J 15/062; F16J 15/106; F16J 15/10; F16J 15/104
See application file for complete search history.

(56) References Cited

U.S. PATENT DOCUMENTS

| | | | | |
|---|---|---|---|---|
| 2,032,492 A | | 3/1936 | Nathan | |
| 2,247,032 A | * | 6/1941 | Norton | F16L 19/086 285/321 |
| 3,203,511 A | * | 8/1965 | Long, Jr. | F16J 15/3232 188/315 |
| 4,603,893 A | * | 8/1986 | Takahashi | F16L 21/06 285/342 |
| 4,909,520 A | * | 3/1990 | Gallagher | F16J 15/56 277/560 |
| 5,474,337 A | * | 12/1995 | Nepsund | F16L 21/03 285/94 |
| 6,168,210 B1 | * | 1/2001 | Bird | F16L 21/04 285/369 |
| 6,220,635 B1 | * | 4/2001 | Vitel | F16L 21/08 285/337 |
| 7,104,573 B2 | * | 9/2006 | Copeland | F16L 21/08 285/342 |
| 7,537,248 B2 | | 5/2009 | Jones et al. | |
| 7,845,686 B2 | | 12/2010 | Steinbruck | |
| 2017/0328503 A1 | | 11/2017 | Copeland | |

OTHER PUBLICATIONS

EBAA Iron Inc: EBAA—Seal Improved Mechanical Joint Gasket Brochure; https://ebaa.com/files/pdf/brochures/Brochure.EBAA-Seal.pdf; 2 pages.
Water, Sewer & Drain Fittings B-15: Mechanical Joint Restraints; https://www.ejprescott.com/media/reference/MechanicalJointRestrB-15.pdf; 7 pages.
International Search Report and Written Opinion for corresponding International Application No. PCT/US21/42036, dated May 12, 2022; 8 pages.

* cited by examiner

*Primary Examiner* — Vishal A Patel
(74) *Attorney, Agent, or Firm* — Haynes and Boone, LLP

(57) ABSTRACT

A mechanical joint according to which a gasket includes wipers, or protrusions, on an internal surface of the gasket, on an external surface of the gasket, or on both internal and external surfaces of the gasket.

7 Claims, 12 Drawing Sheets

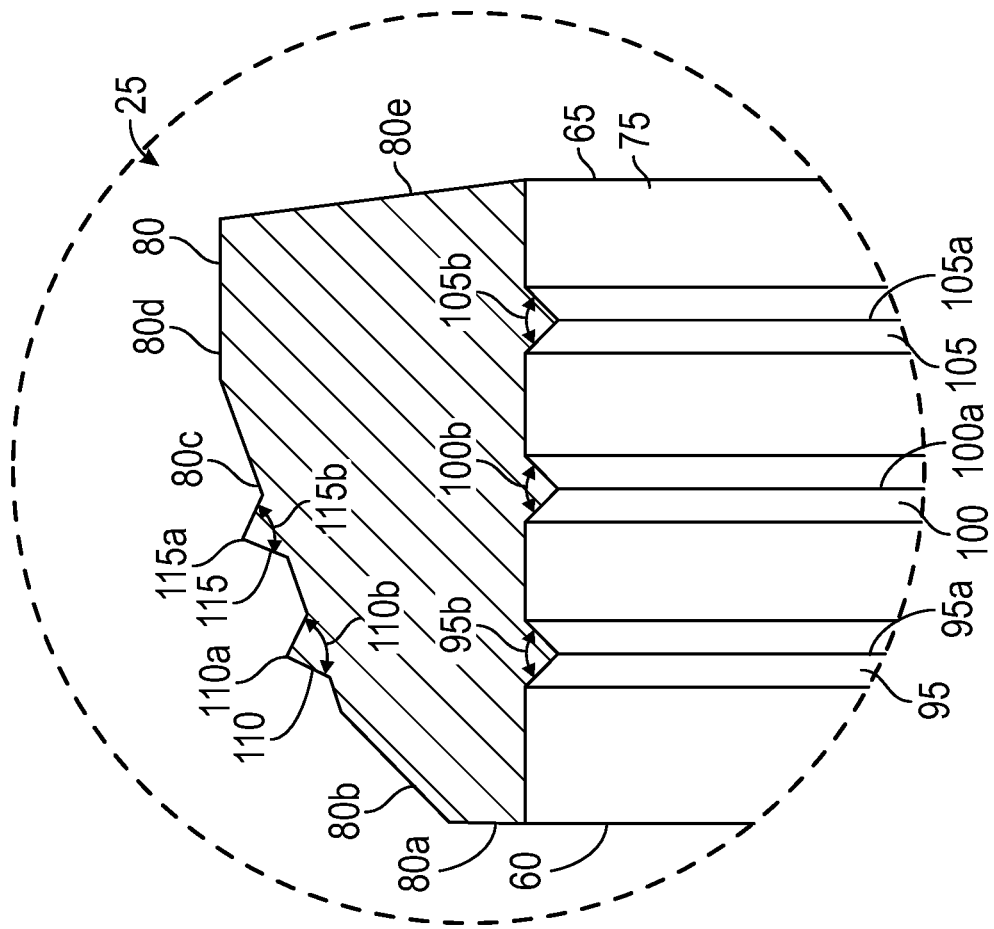
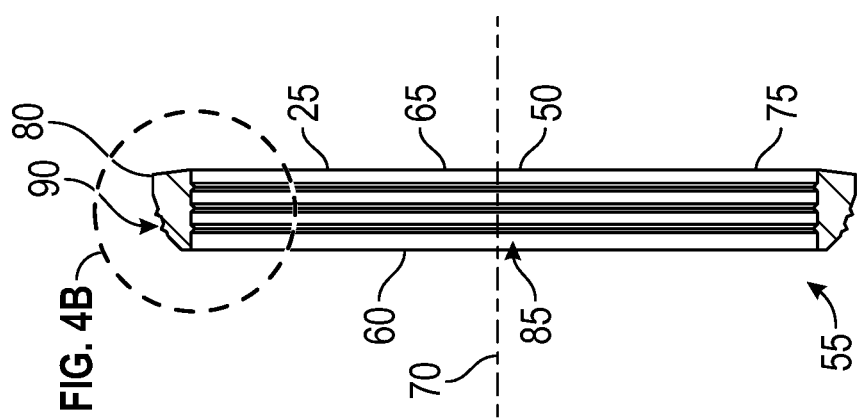
FIG. 4B
FIG. 4A

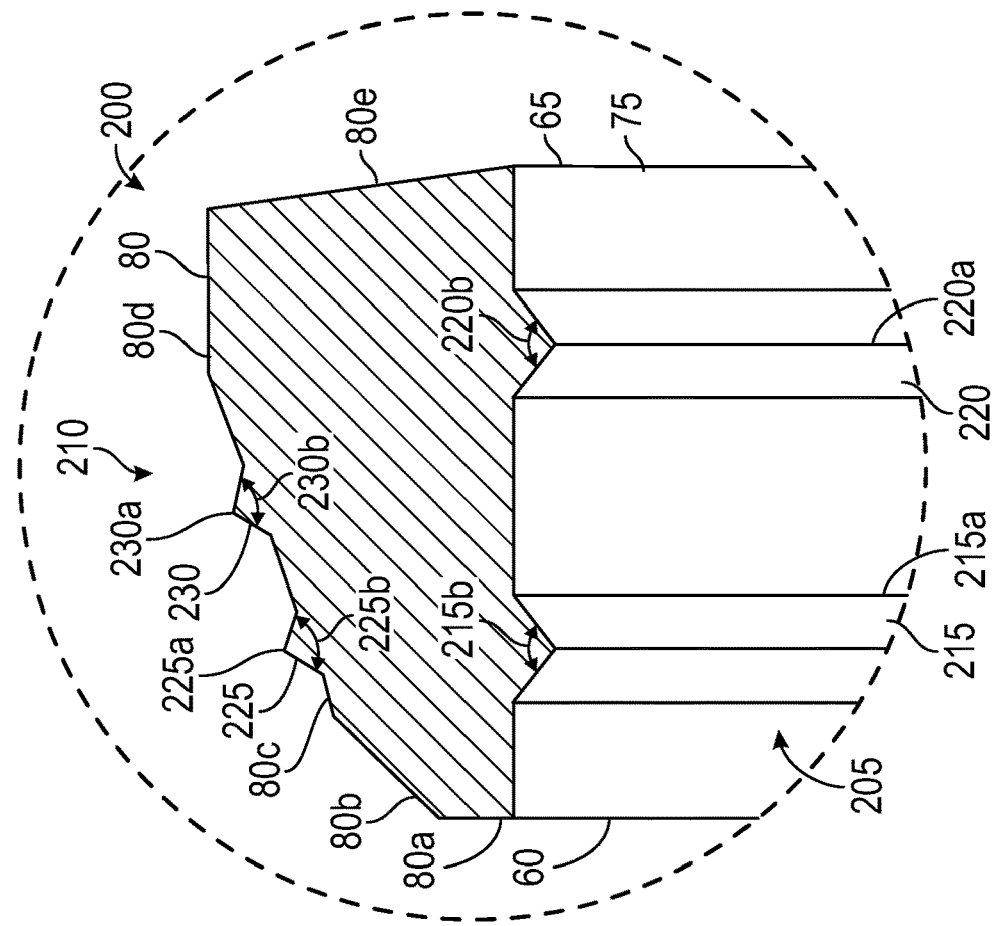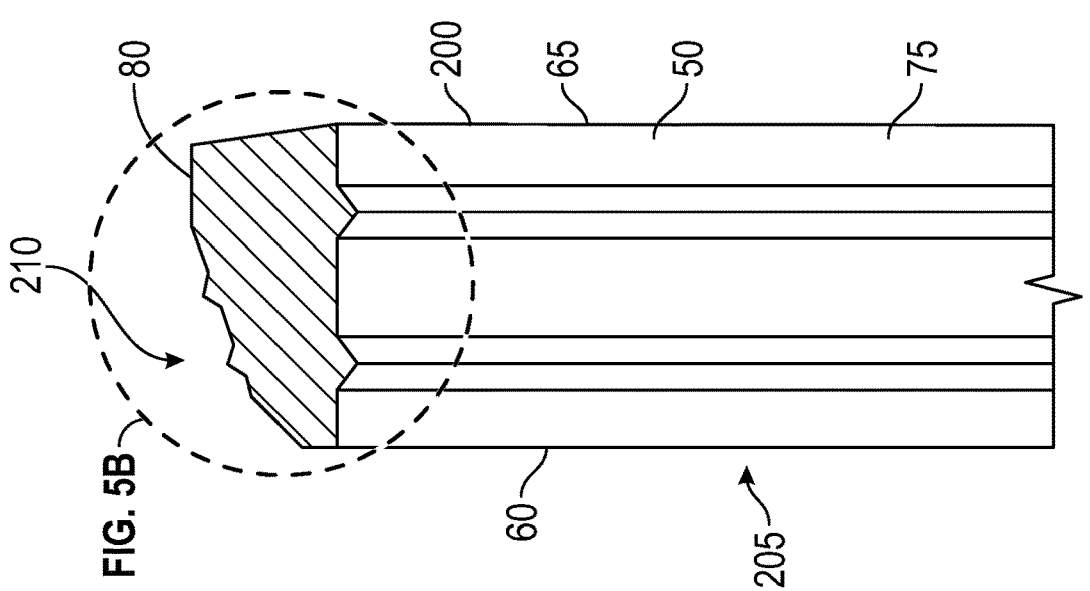

Prior. Art

MECHANICAL JOINT GASKET WITH PROTRUSIONS

CROSS-REFERENCE TO RELATED APPLICATION

This application claims the benefit of the filing date of, and priority to, U.S. Application No. 63/053,240, filed Jul. 17, 2020, the entire disclosure of which is hereby incorporated herein by reference.

TECHNICAL FIELD

This disclosure relates in general to mechanical joints and in particular to mechanical joint gaskets.

BACKGROUND

In some cases, conventional mechanical joint gaskets are unable to sufficiently maintain a seal on pipes having textured surfaces. Pipes with textured surfaces represent a typical production run, as offered by manufacturers engaged in manufacturing ductile iron pipe in the diameter of 60 inches. For example, American Cast Iron Pipe Company ("ACIPCO") offers a very rough surfaced or textured pipe. The surface roughness of the pipe is due to a mold preparation process that includes shot peening. As the ductile iron pipe is centrifugally cast, the hot iron creates a severe thermal shock to the water-cooled steel mold. This shock is detrimental to the life of the mold. Shot peening of the surface of the mold creates a compressed condition on the surface of the mold, thereby reducing the potential for stress cracking and other effects impairing the life of the mold. These peen patterns of the pipe molds, when significantly pronounced, result in overlapping and/or randomized bumps in the external surface of the pipe, which create leak paths for water or other fluids.

BRIEF DESCRIPTION OF THE DRAWINGS

FIG. 4A is a cross-sectional view of the gasket of FIGS. 1 and 2, according to a first embodiment.

FIG. 4B is an enlarged view of a portion of the cross-sectional view of FIG. 4A, according to the first embodiment.

FIG. 5A is a partial cross-sectional view of the gasket of FIGS. 1 and 2, according to a second embodiment.

FIG. 5B is an enlarged view of a portion of the cross-sectional view of FIG. 5A, according to the second embodiment.

DETAILED DESCRIPTION

Figure 1:
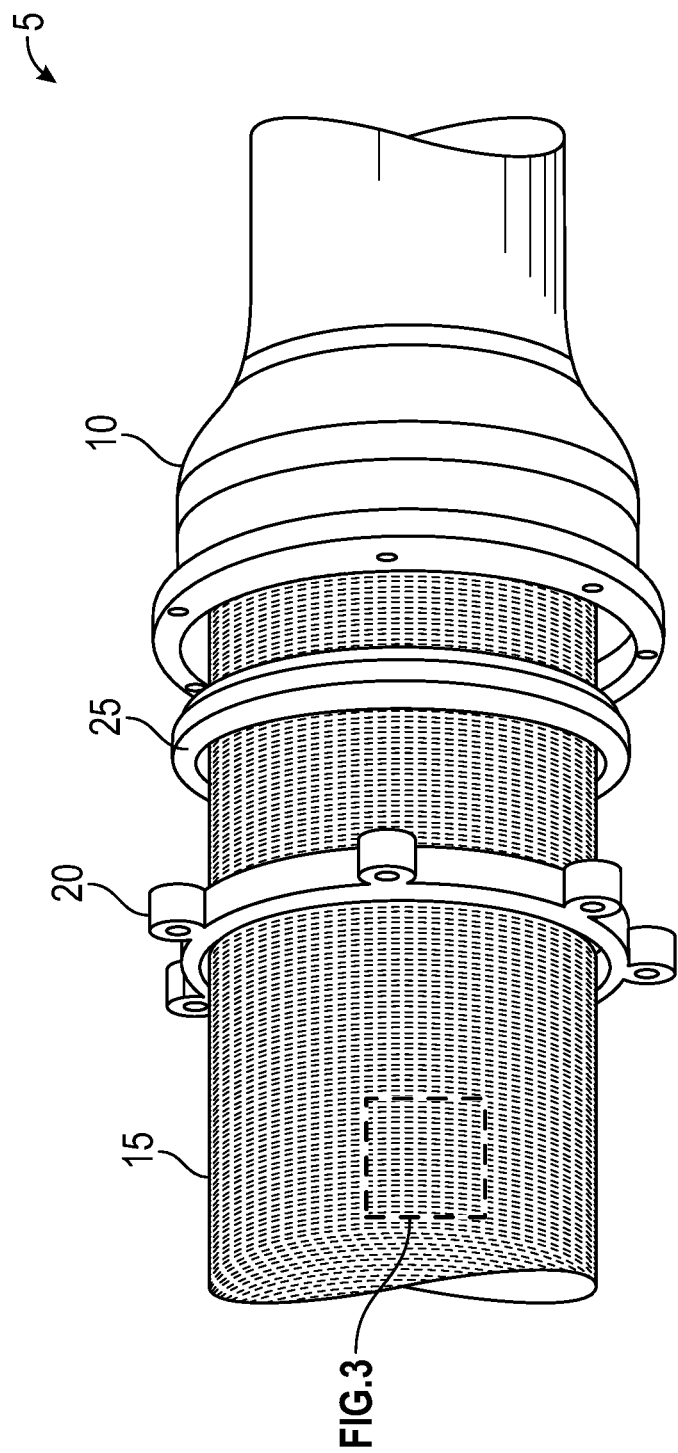
FIG. 1 is a partially disassembled view of a mechanical joint, according to one embodiment.
Figure 2:
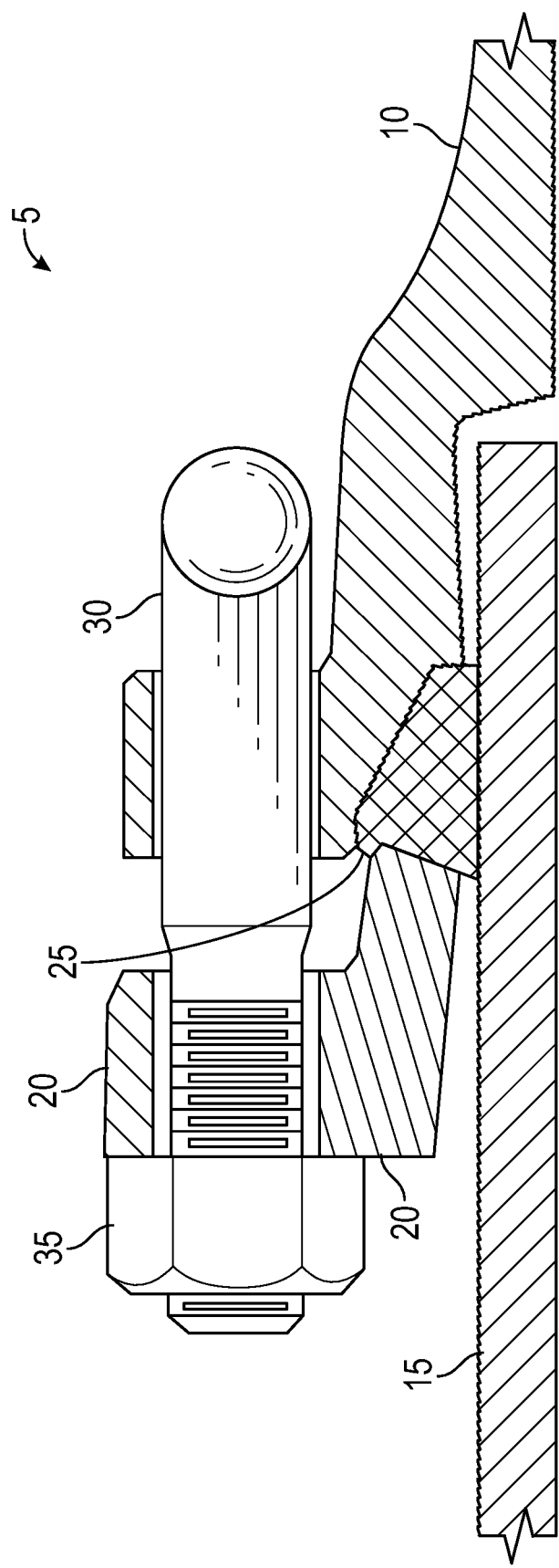
FIG. 2 is a partial cross-sectional view of the mechanical joint of FIG. 1, the mechanical joint including a bell coupled to a spigot end of a pipe using a gland, a gasket, t-bolts, and nuts, according to one embodiment.

In an exemplary embodiment, as illustrated in FIGS. 1 and 2, a mechanical joint 5 includes a bell 10 that couples to a spigot end of a pipe 15 using a gland 20, a gasket 25, t-bolts 30, and nuts 35. In some embodiments, the mechanical joint 5 is used to seal two pieces of pipe such that the pipe can be used to transport a liquid under pressure. In some embodiments, the mechanical joint 5 is used to couple two portions or pieces of pipe that will be buried underground.

Figure 3:
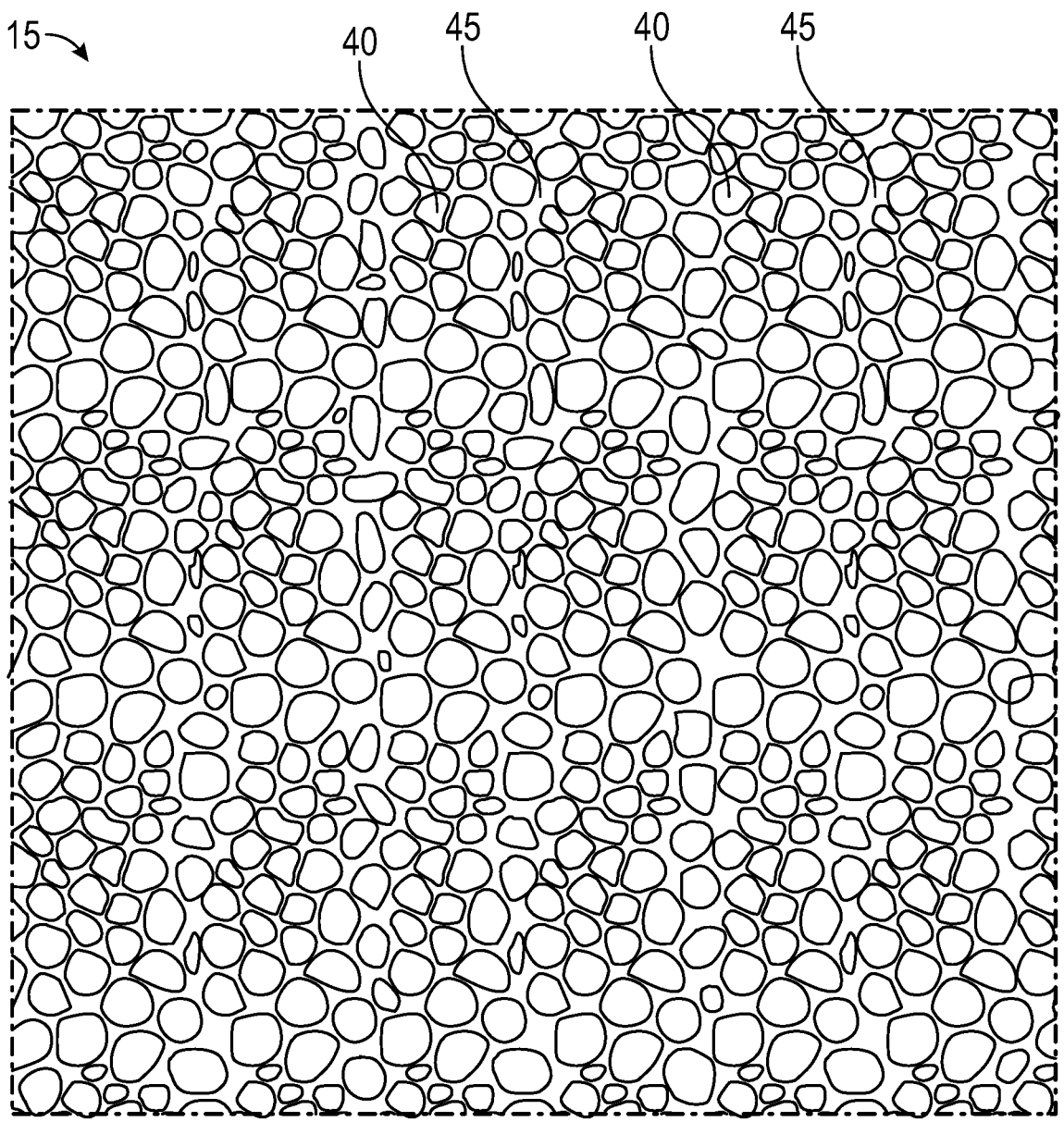
FIG. 3 is an enlarged view of a portion of the pipe of FIGS. 1 and 2, according to an example embodiment.

In some embodiments, the pipe 15 is approximately a 60" nominal pipe size and made of ductile iron pipe, but the inner diameter of the pipe may vary. In some embodiments, the external surface of the pipe 15 is textured due to the use of a shot peened mold in forming the pipe 15. When the mold used is shot peened, the surface of the mold forms dimples. As such, and as illustrated in FIG. 3, the pipe 15, which is formed using a shot peened surface, has a surface that forms inverse dimples. In some embodiments, the inverse dimples forms overlapping and/or randomized bumps 40 in the surface of the pipe 15. Between the bumps 40 are a series of valleys or channels 45. The bump size depends on the dimensions of the balls used in the shot peening of the mold. In some embodiments, the pipe 15 is manufactured by American Cast Iron Pipe Company ("ACIPCO") of Birmingham, Ala., USA.

In some embodiments, the bell 10 has an inner diameter that is greater than an external diameter of the pipe 15 such that a portion of the bell 10 receives a portion of the pipe 15. In some embodiments and as illustrated in FIG. 2, at least an inner surface of the bell 10 is formed from a shot peened mold and has overlapping and/or randomized bumps and channels similar to the bumps 40 and channels 45 on the external surface of the pipe 15.

Figure 4C:
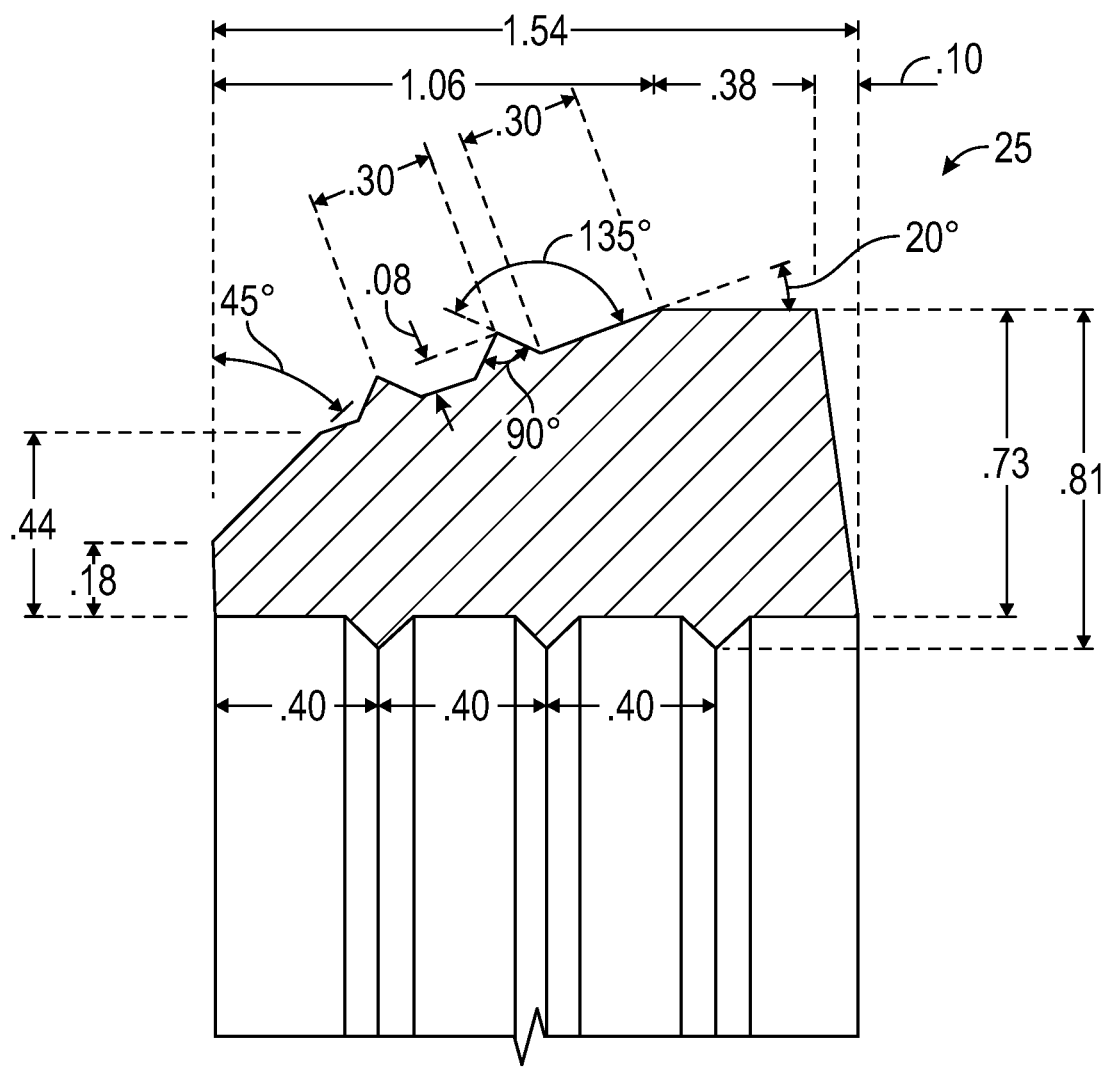
FIG. 4C is a view like that of FIG. 4B but including values of dimensions and angles.

In some embodiments and as illustrated in FIGS. 4A-4C, the gasket 25 has a ring-shaped body 50 forming an opening 55, with the opening 55 extending between a first end 60 of the body 50 and an opposing second end 65 of the body 50. The opening 55 has a center illustrated by the line 70 in FIG. 4A. The body 50 has an inner surface 75 adapted to engage the pipe 15 and an outer surface 80 adapted to engage the bell 10. In some embodiments, the outer surface 80 includes a first face 80*a* that defines the first end 60, a second face 80*b*, a third face 80*c*, a fourth face 80*d*, and a fifth face 80*e* that defines the second end 65. As illustrated in FIG. 4C, the first face 80*a* is generally perpendicular to the inner surface 75 and to the fourth face 80*d*; the fourth face 80*d* is parallel to portions of the inner surface 75, the third surface 80*c* forms a 20-degree angle with the fourth face 80*d*, and the first face 80*a* forms a 45-degree angle with the second face 80*b*. As such, the third face 80*c* is also angled, at a 20-degree angle, relative to portions of the inner surface 75. In some embodiments, the inner surface 75 defines the opening 55 and the outer surface 80 defines an outer circumference of the gasket 25. A first plurality of wipers, or protrusions 85, is formed by the inner surface 75 of the body 50 and a second plurality of protrusions 90 is formed by the outer surface 80.

As illustrated, the first plurality of protrusions 85 includes a first protrusion 95, a second protrusion 100, and a third protrusion 105. Each of the protrusions 95, 100, and 105 extends toward the center of the opening 55. Each of the protrusions 95, 100, and 105 is spaced from each other, the first end 60, and the second end 65. As illustrated, each of the protrusions 95, 100, and 105 is V-shaped having peaks 95a, 100a, and 105a, respectively, to define angles 95b, 100b, and 105b, respectively. In some embodiments, the peaks 95a and 100a are spaced by about 0.40 inches and the peaks 100a and 105a are spaced by about 0.40 inches. In some embodiments, the peak 95a is spaced from the first end 60 by about 0.40 inches and the peak 105a is spaced from the second end 65 by about 0.34 inches. In some embodiments, the angles 95b, 100b, and 105b are 90 degrees or about 90 degrees. While the angles 95b, 100b, and 105b are illustrated as being of identical in FIGS. 4A-4C, in other embodiments the angles 95b, 100b, and 105b may not be identical. In some embodiments, each of the peaks 95a, 100a, and 105a has a height, extending towards the center of the opening 55, of about 0.10 inches. While the heights of the peaks 95a, 100a, and 105a are illustrated as being identical in FIGS. 4A-4C, in some embodiments the heights of the peaks 95a, 100a, and 105a are not identical.

As illustrated, the second plurality of protrusions 90 includes a first protrusion 110 and a second protrusion 115, with each of the protrusions 110 and 115 formed in the third face 80c of the outer surface. As such, each of the protrusions 110 and 115 extends away from the center of the opening 55 at a 20-degree angle. The protrusions 110 and 115 are spaced from each other, the first end 60, and the second end 65. As illustrated, each of the protrusions 110 and 115 is V-shaped having peaks 110a and 115a, respectively, to define angles 110b and 115b, respectively. In some embodiments, the peaks 110a and 115a are spaced by about 0.30 inches. In some embodiments, the angles 110b and 115b are 90 degrees or about 90 degrees. While the angles 110b and 115b are illustrated as being of identical in FIGS. 4A-4C, in other embodiments the angles 110b and 115b may not be identical. In some embodiments, each of the peaks 110a and 115a has a height, extending away from the third face 80c, of about 0.08 inches. While the heights of the peaks 110a and 115a are illustrated as being identical in FIGS. 4A-4C, in some embodiments the heights of the peaks 110a and 115a are not identical.

In some embodiments, the angles 110b and 115b are identical to the angles 95b, 100b, and 105b. In other embodiments, the angles 110b and 115b are different from the angles 95b, 100b, and 105b. In some embodiments, the heights of the peaks 110a and 115a are identical to the heights of the peaks 95a, 100a, and 105a. In other embodiments, the heights of the peaks 110a and 115a are different from the heights of the peaks 95a, 100a, and 105a. As such, in some embodiments the first plurality of protrusions 80 has the same size as the second plurality of protrusions 85. In other embodiments, the first plurality of protrusions 85 has a different size than the second plurality of protrusions 90. In some embodiments, the first plurality of protrusions 85 is also angled relative to the second plurality of protrusions 90.

As illustrated, the ring-shaped body 50 forms an uninterrupted continuous ring and each of the protrusions 95, 100, 105, 110, and 115 also forms an uninterrupted continuous ring. Generally, each of the rings formed by the protrusions 95, 100, and 105 are in parallel and each of the rings formed by the protrusions 110 and 115 are in parallel.

In operation, with continuing reference to FIGS. 4A-4C and referring back to FIGS. 1-3, the bell 10 is coupled to the spigot end of the pipe 15. The t-bolts 30 extend through respective coaxial openings in bell 10 and the gland 20, so that the respective threaded portions of the t-bolts 30 extend beyond the gland 20. The nuts 35 are tightly threadably engaged with the threaded portions of the t-bolts 30, respectively. As a result, the gland 20 and the bell 10 are drawn together, compressing the gasket 25 therebetween so that the gasket 25 sealingly engages the textured external surface of the pipe 15, as well as the textured internal surface of the bell 10. More particularly, the inner surface 75, and the protrusions 95, 100, and 105, sealingly engage the textured external surface of the pipe 15, with the protrusions 95, 100, and 105 deforming around the bumps 40, sealingly engaging the surface(s) defining the channels 45 or valleys. Likewise, at least portions of the outer surface 80, and the protrusions 110 and 115, sealingly engage the textured internal surface of the bell 10, with the protrusions 110 and 115 deforming in a manner like that of the protrusions 95, 100, and 105. As a result, in one or more embodiments, the gasket 25 prevents pressurized liquid in the pipe 15 and the bell 10 from leaking across the gasket 25 and out of the mechanical joint 5, notwithstanding the textured surfaces against which the gasket 25 is sealingly engaged. In some embodiments, a grip ring (not shown) is positioned between the gland 20 and the gasket 25.

Figure 5C:
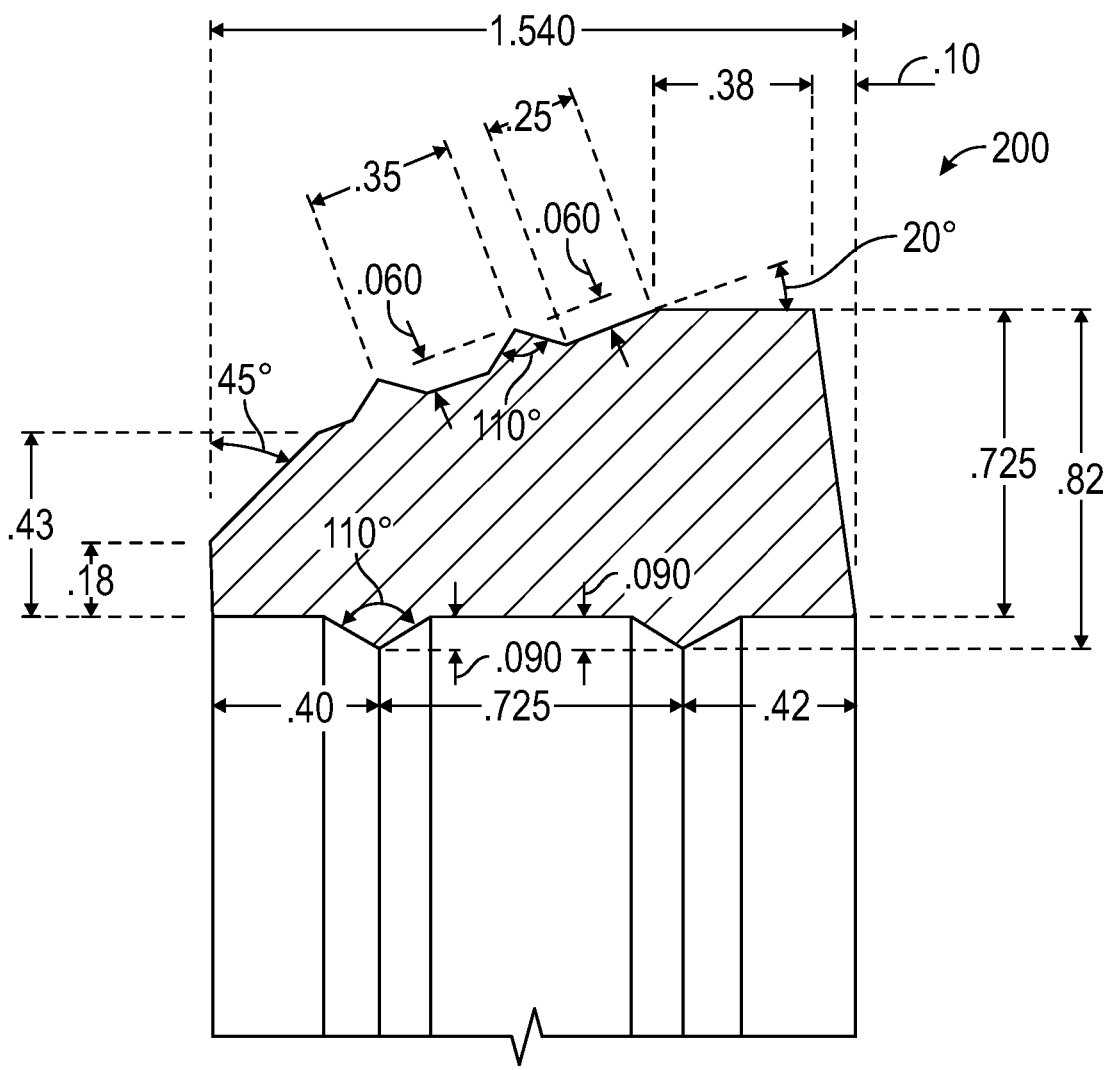
FIG. 5C is a view like that of FIG. 5B but including values of dimensions and angles.

FIGS. 5A-5C illustrate another embodiment of the gasket 25 that is designated by the numeral 200. The gasket 200 is similar to the gasket 25 and the same numerals are used to identify elements of the gasket 200 that are identical to the elements of the gasket 25. For example, the gasket 200 has the ring-shaped body 50 forming the opening 55, with the opening 55 extending between the first end 60 of the body 50 and the opposing second end 65 of the body 50. The body 50 has the inner surface 75 adapted to engage the pipe 15 and the outer surface 80 adapted to engage the bell 10. In some embodiments, the outer surface 80 includes the first face 80a that defines the first end 60, the second face 80b, the third face 80c, the fourth face 80d, and the fifth face 80e that defines the second end 65. As illustrated in FIG. 5C, the first face 80a is generally perpendicular to the inner surface 75 and to the fourth face 80d; the fourth face 80d is parallel to portions of the inner surface 75, the third surface 80c forms a 20-degree angle with the fourth face 80d, and the first face 80a forms a 45-degree angle with the second face 80b. As such, the third face 80c is also angled, at a 20-degree angle, relative to portions of the inner surface 75. In some embodiments, the inner surface 75 defines the opening 55 and the outer surface 80 defines the outer circumference of the gasket 25. A first plurality of protrusions 205 is formed by the inner surface 75 of the body 50 of the gasket 200 and a second plurality of protrusions 210 is formed by the outer surface 80 of the gasket 200.

As illustrated, the first plurality of protrusions 205 includes a first protrusion 215 and a second protrusion 220. Each of the protrusions 215 and 220 extends toward the center of the opening 55. Each of the protrusions 215 and 220 is spaced from the other, the first end 60, and the second end 65. As illustrated, each of the protrusions 215 and 220 is V-shaped having peaks 215a and 220a, respectively, to define angles 215b and 220b, respectively. In some embodiments, the peaks 215a and 220a are spaced by about 0.725 inches. In some embodiments, the peak 215a is spaced from the first end 60 by about 0.40 inches and the peak 220a is spaced from the second end 65 by about 0.42 inches. In some embodiments, the angles 215b and 220b are 110 degrees or about 110 degrees. While the angles 215b and 220b are illustrated as being of identical in FIGS. 5A-5C, in other embodiments the angles 215b and 220b may not be identical. In some embodiments, each of the peaks 215a and 220a has a height, extending towards the center of the opening 55, of about 0.09 inches. While the heights of the peaks 215a and 220a are illustrated as being identical in FIGS. 5A-5C, in some embodiments the heights of the peaks 215a and 220a are not identical.

As illustrated, the second plurality of protrusions 210 includes a first protrusion 225 and a second protrusion 230, with each of the protrusions 225 and 230 formed in the third face 80c of the outer surface. As such, each of the protrusions 225 and 230 extends away from the center of the opening 55 at a 20-degree angle. The protrusions 225 and 230 are spaced from each other, the first end 60, and the second end 65. As illustrated, each of the protrusions 225 and 230 is V-shaped having peaks 225a and 230a, respectively, to define angles 225b and 230b, respectively. In some embodiments, the peaks 225a and 230a are spaced by about 0.35 inches. In some embodiments, the angles 225b and 230b are 110 degrees or about 110 degrees. While the angles 225b and 230b are illustrated as being of identical in FIGS. 5A-5C, in other embodiments the angles 225b and 230b may not be identical. In some embodiments, each of the peaks 225a and 230a has a height, extending away from the third face 80c, of about 0.06 inches. While the heights of the peaks 225a and 230a are illustrated as being identical in FIGS. 5A-5C, in some embodiments the heights of the peaks 225a and 230a are not identical.

In some embodiments, the angles 215b and 220b are identical to the angles 225b and 230b. In other embodiments, the angles 215b and 220b are different from the angles 225b and 230b. In some embodiments, the heights of the peaks 215a and 220a are identical to the heights of the peaks 225a and 230a. In other embodiments, the heights of the peaks 215a and 220a are different from to the heights of the peaks 225a and 230a. As such, in some embodiments the first plurality of protrusions 205 has the same size as the second plurality of protrusions 210. In other embodiments, the first plurality of protrusions 205 has a different size than the second plurality of protrusions 210. In some embodiments, the first plurality of protrusions 205 is also angled relative to the second plurality of protrusions 210.

As illustrated, the ring-shaped body 50 of the gasket 200 forms an uninterrupted continuous ring and each of the protrusions 215, 220, 225, and 230 also forms an uninterrupted continuous ring. Generally, each of the rings formed by the protrusions 215 and 220 are in parallel and each of the rings formed by the protrusions 225 and 230 are in parallel.

Figure 6B:
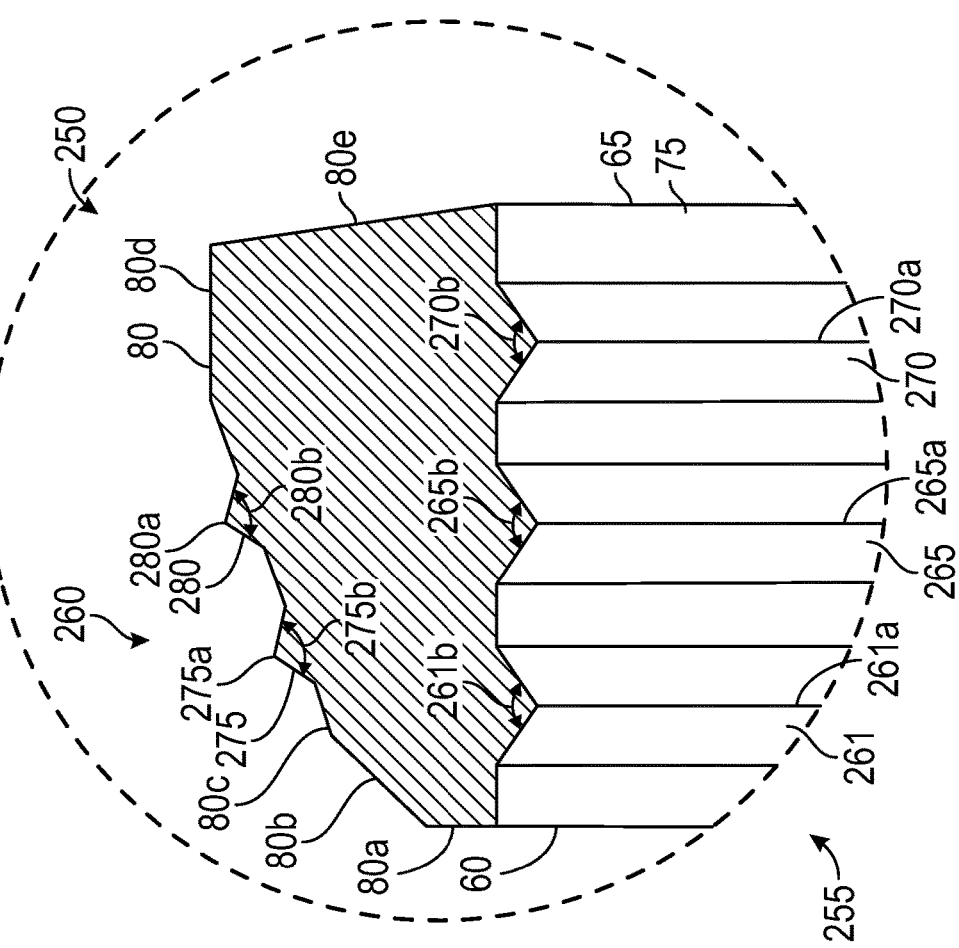
FIG. 6B is an enlarged view of a portion of the cross-sectional view of FIG. 6A, according to the third embodiment.
Figure 6A:
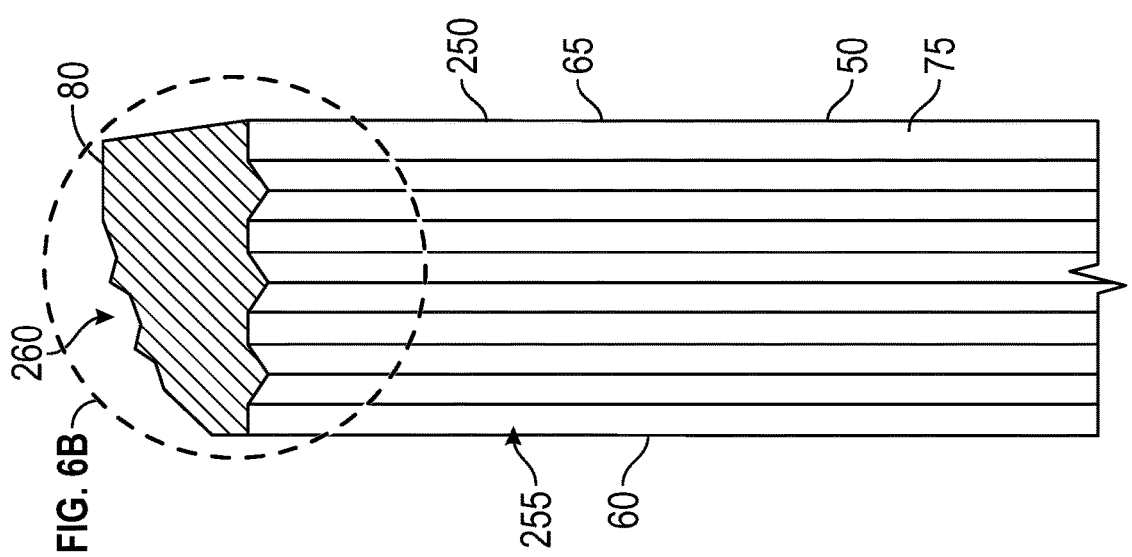
FIG. 6A is a partial cross-sectional view of the gasket of FIGS. 1 and 2, according to a third embodiment.
Figure 6C:
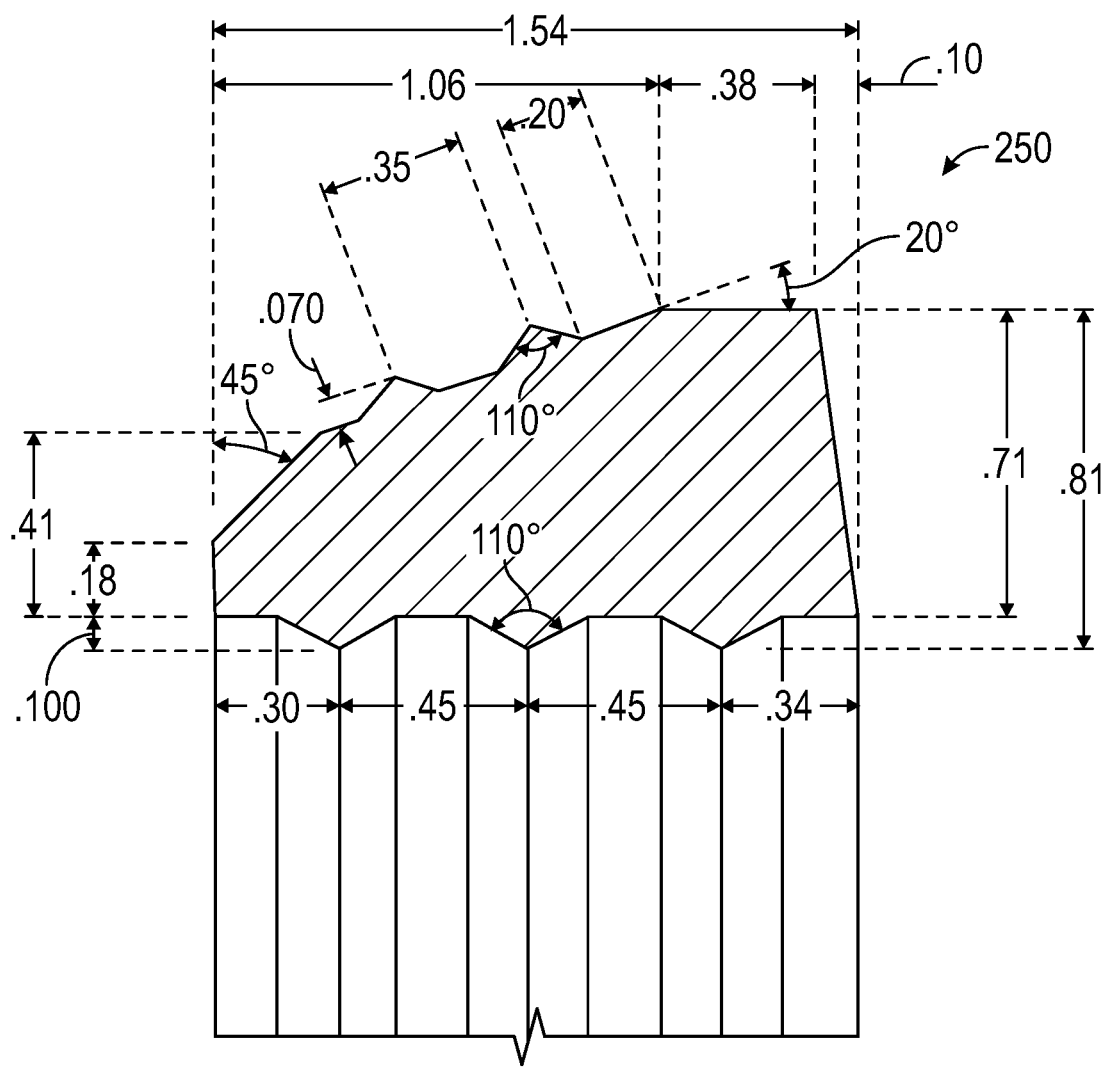
FIG. 6C is a view like that of FIG. 6B but including dimensions.

FIGS. 6A-6C illustrate yet another embodiment of the gasket 25 that is designated by the numeral 250. The gasket 250 is similar to the gasket 25 and the same numerals are used to identify elements of the gasket 250 that are identical to the elements of the gasket 25. For example, the gasket 250 has the ring-shaped body 50 forming the opening 55, with the opening 55 extending between the first end 60 of the body 50 and the opposing second end 65 of the body 50. The body 50 has the inner surface 75 adapted to engage the pipe 15 and the outer surface 80 adapted to engage the bell 10. In some embodiments, the outer surface 80 includes the first face 80a that defines the first end 60, the second face 80b, the third face 80c, the fourth face 80d, and the fifth face 80e that defines the second end 65. As illustrated in FIG. 6C, the first face 80a is generally perpendicular to the inner surface 75 and to the fourth face 80d; the fourth face 80d is parallel to portions of the inner surface 75, the third surface 80c forms a 20-degree angle with the fourth face 80d, and the first face 80a forms a 45-degree angle with the second face 80b. As such, the third face 80c is also angled, at a 20-degree angle, relative to portions of the inner surface 75. In some embodiments, the inner surface 75 defines the opening 55 and the outer surface 80 defines the outer circumference of the gasket 25. A first plurality of protrusions 255 is formed by the inner surface 75 of the body 50 of the gasket 250 and a second plurality of protrusions 260 is formed by the outer surface 80 of the gasket 250.

As illustrated, the first plurality of protrusions 255 includes a first protrusion 261, a second protrusion 265, and a third protrusion 270. Each of the protrusions 261, 265, and 270 extends toward the center of the opening 55. Each of the protrusions 261, 265, and 270 is spaced from the each other, the first end 60, and the second end 65. As illustrated, each of the protrusions 261, 265, and 270 is V-shaped having peaks 261a, 265a, and 270a, respectively, to define angles 261b, 265b, and 270b, respectively. In some embodiments, the peaks 261a and 265a are spaced by about 0.45 inches and the peaks 265a and 270a are spaced by about 0.45 inches. In some embodiments, the peak 261a is spaced from the first end 60 by about 0.30 inches and the peak 270a is spaced from the second end 65 by about 0.34 inches. In some embodiments, the angles 261b, 265b, and 270b are 110 degrees or about 110 degrees. While the angles 261b, 265b, and 270b are illustrated as being of identical in FIGS. 6A-6C, in other embodiments the angles 261b, 265b, and 270b may not be identical. In some embodiments, each of the peaks 261a, 265a, and 270a has a height, extending towards the center of the opening 55, of about 0.10 inches. While the heights of the peaks 261a, 265a, and 270a are illustrated as being identical in FIGS. 6A-6C, in some embodiments the heights of the peaks 261a, 265a, and 270a are not identical.

As illustrated, the second plurality of protrusions 260 includes a first protrusion 275 and a second protrusion 280, with each of the protrusions 275 and 280 formed in the third face 80c of the outer surface 80. As such, each of the protrusions 275 and 280 extends away from the center of the opening 55 at a 20-degree angle. The protrusions 275 and 280 are spaced from each other, the first end 60, and the second end 65. As illustrated, each of the protrusions 275 and 280 is V-shaped having peaks 275a and 280a, respectively, to define angles 275b and 280b, respectively. In some embodiments, the peaks 275a and 280a are spaced by about 0.35 inches. In some embodiments, the angles 275b and 280b are 110 degrees or about 110 degrees. While the angles 275b and 280b are illustrated as being of identical in FIGS. 6A-6C, in other embodiments the angles 275b and 280b may not be identical. In some embodiments, each of the peaks 275a and 280a has a height, extending away from the third face 80c, of about 0.07 inches. While the heights of the peaks 275a and 280a are illustrated as being identical in FIGS. 6A-6C, in some embodiments the heights of the peaks 275a and 280a are not identical.

In some embodiments, the angles 261b, 265b, and 270b are identical to the angles 275b and 280b. In other embodiments, the angles 261b, 265b, and 270b are different from the angles 275b and 280b. In some embodiments, the heights of the peaks 261a, 265a, and 270a are identical to the heights of the peaks 275a and 280a. In other embodiments, the heights of the peaks 261a, 265a, and 270a are different from to the heights of the 275a and 280a. As such, in some embodiments the first plurality of protrusions 255 have the same size as the second plurality of protrusions 260. In other embodiments, the first plurality of protrusions 255 have a different size than the second plurality of protrusions 260. In some embodiments, the first plurality of protrusions 255 is also angled relative to the second plurality of protrusions 260.

As illustrated, the ring-shaped body 50 of the gasket 250 forms an uninterrupted continuous ring and each of the protrusions 261, 265, 270, 275, and 280 also forms an uninterrupted continuous ring. Generally, each of the rings formed by the protrusions 261, 265, and 270 are in parallel and each of the rings formed by the protrusions 275 and 280 are in parallel.

As described above, each of the gaskets 25, 200, and 250 includes wipers or protrusions that are adapted to sealingly engage the exterior surface of the pipe 15 and wipers or protrusions that are adapted to sealingly engage the interior surface of the bell 10. Generally, the protrusions 95, 100, 105, 110, 115, 215, 220, 225, 230, 261, 265, 270, 275, and/or 280 deform around the bumps 40, sealingly engaging the surface(s) forming the channels 45 or valleys. In some embodiments, the protrusions 95, 100, 105, 110, 115, 215, 220, 225, 230, 261, 265, 270, 275, and/or 280 engage the overlapping, random bumps 40 on the surface of the pipe 15 and/or the bell 10, and deform/deflect into channels 45 or valleys formed in the surface of the pipe 15 and/or the bell 10, thereby providing a sealing engagement between the gasket 25, 200, or 250 and the outer surface of the pipe 15 as well as the inner surface of the bell 10. In some embodiments, one or more of the protrusions 95, 100, and 105; 215 and 220; and 261, 265, and 270 circumferentially extend uninterruptedly along an internal surface of the gasket 25, 200, and 250, respectively, and/or one or more protrusions 110 and 115; 225 and 230; and 275 and 280 circumferentially along an external surface of the gasket 25, 200, and 250, respectively. In other embodiments any one or more of the protrusions 95, 100, 105, 110, 115, 215, 220, 225, 230, 261, 265, 270, 275, and/or 280 may not circumferentially extend uninterruptedly around the internal and/or external surface(s) of the gasket 25, 200, or 250.

The inner surface 75 may form any number of protrusions and is not limited to two or three protrusions as illustrated in FIGS. 4A-4C, 5A-5C, and 6A-6C. For example, the inner surface may form one, four, five, six, seven, eight, or more protrusions. The outer surface 80 may form any number of protrusions and is not limited to two protrusions as illustrated in FIGS. 4A-4C, 5A-5C, and 6A-6C. For example, the inner surface may form one, four, five, six, seven, eight, or more protrusions.

In some embodiments, use of the gasket 25, 200, and 250 results in a significant improvement in sealing capability when, for example, the pipe is a pipe formed using a shot peened mold.

In some embodiments, conventional gaskets form a "flat contact profile" between the gasket and another surface. Generally, a flat contact profile results from a gasket with a contact surface that is smooth or without protuberances/wipers. Generally, conventional gaskets cannot mold, deflect, and/or deform themselves down into the valleys or channels formed between the overlapping and/or randomized bumps.

In some embodiments, mechanical joint gaskets of the present disclosure are formed from a styrene-butadiene rubber ("SBR") compound. In some embodiments, mechanical joint gaskets of the present disclosure are formed from nitrile rubber. In some embodiments, mechanical joint gaskets of the present disclosure are formed from ethylene propylene diene monomer ("EPDM") rubber. In some embodiments, mechanical joint gaskets of the present disclosure are formed from neoprene. In some embodiments, mechanical joint gaskets of the present disclosure are formed from an FKM material such as, for example, Viton® brand FKM material.

Figure 7:
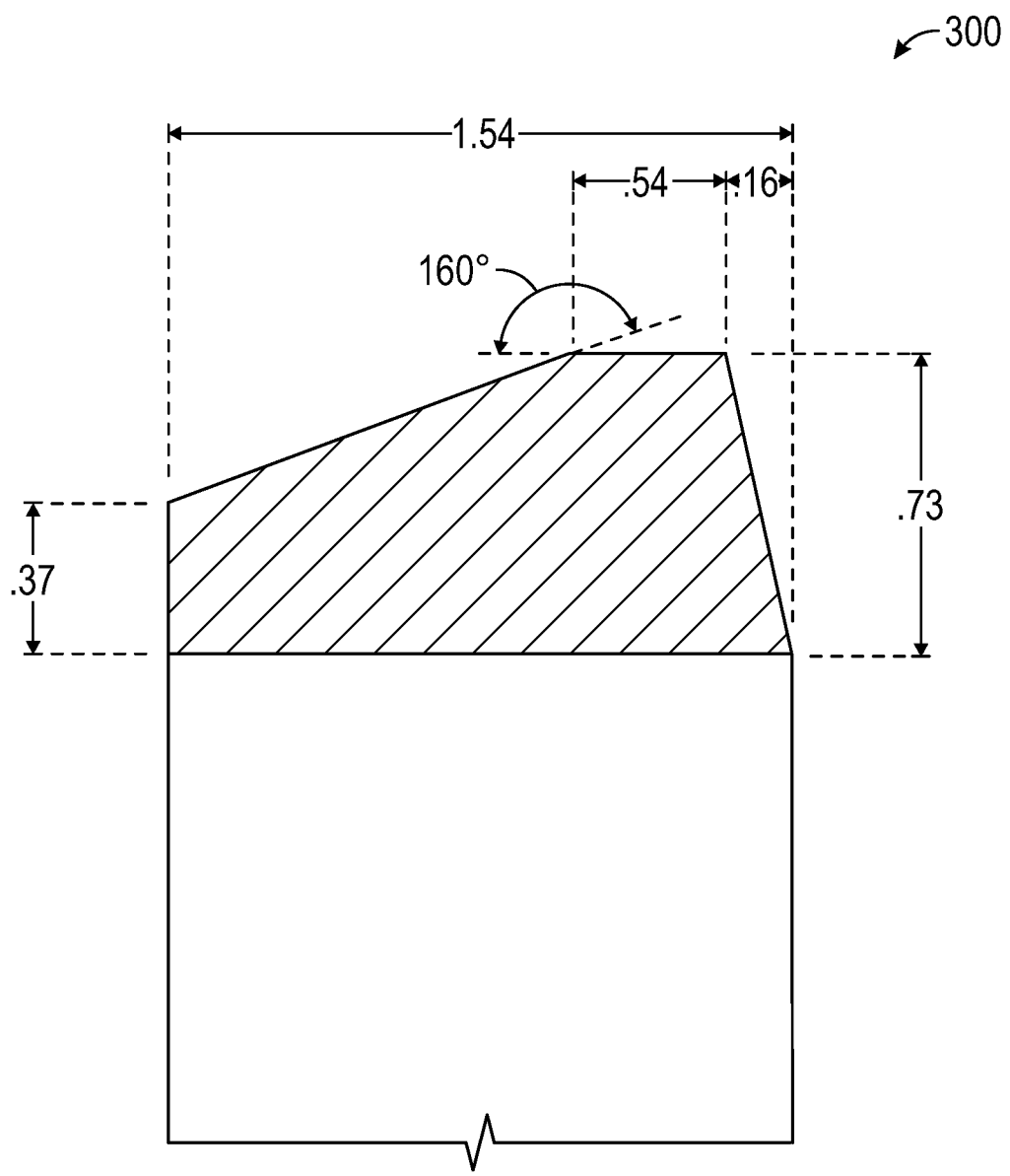
FIG. 7 is a sectional view of a portion of a mechanical joint seal.

In an experimental embodiment, experimental testing was conducted with a Standardized Mechanical Joint Seal 300 by EBAA Iron Inc., Eastland, Tex. The seal 300 and its dimensions are illustrated in FIG. 7. The experimental test fixture was like that shown in FIGS. 1 and 2, with the seal 300 sealingly engaging experimental embodiments of the bell 10 and the pipe 15. The pipe 15 was an iron ductile pipe having a nominal 60-inch diameter and manufactured by ACIPCO, and had the overlapping and/or randomized bumps 40 protruding from its external surface. The bell 10 was also manufactured by ACIPCO, and had overlapping and/or random bumps, like that of the bumps 40, protruding from its internal surface. During the experimental testing, the pipe 15 and the bell 10 were increasingly pressurized until leakage across the seal 300 occurred.

Figure 8:
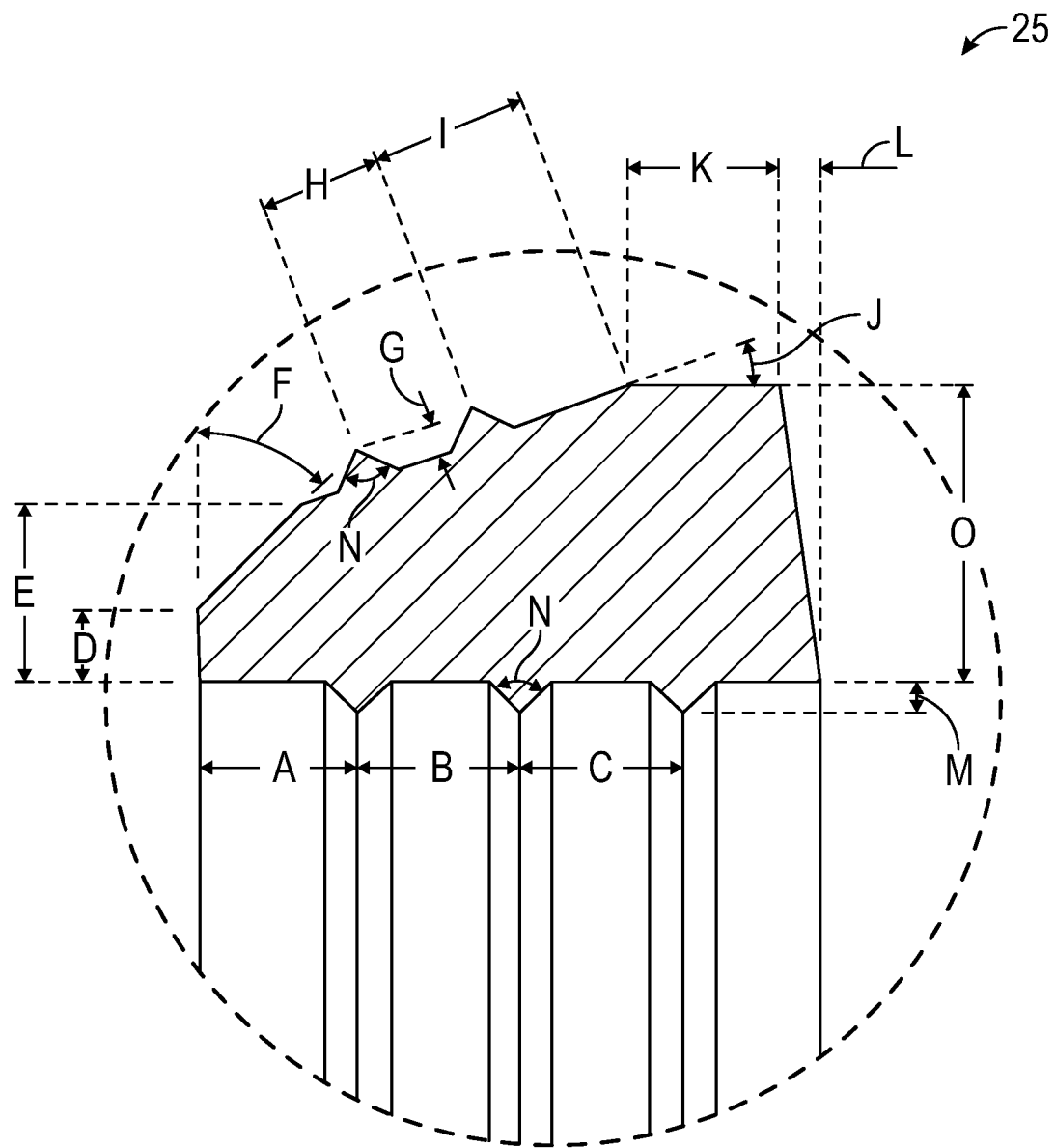
FIG. 8 is a cross-sectional view of the first embodiment of FIGS. 4A, 4B, and 4C, and is similar to that of FIG. 4C but indicates dimensions and angles without specific values thereof.

Using the above-described experimental test fixture and method, experimental testing was then conducted with an experimental embodiment of the gasket 25 of FIGS. 4A, 4B, and 4C. A dimensioned version of the experimental embodiment of the gasket 25 is illustrated in FIG. 8, which shows dimensions/angles (collectively "the dimensions") A-O. Unless otherwise shown in FIG. 8, the experimental embodiment of the gasket 25 of FIGS. 4A, 4B, and 4C has the same dimensions as those of the seal 300 illustrated in FIG. 7. The values of the dimensions A-O are set forth in Table 1 below:

TABLE 1

Dimensions/Angles of the Experimental Embodiment of Gasket 25

| Dimension/Angle | Value |
| --- | --- |
| A | 0.40 inches |
| B | 0.40 inches |
| C | 0.40 inches |
| D | 0.18 inches |
| E | 0.44 inches |
| F | 45 degrees |
| G | 0.08 inches |
| H | 0.30 inches |
| I | 0.30 inches |
| J | 20 degrees |
| K | 0.38 inches |
| L | 0.10 inches |
| M | 0.08 inches |
| N | 90 degrees |
| O | 0.73 inches |

A comparison of the experimental testing of the seal 300 and the experimental embodiment of the gasket 25, showing maximum pressures until leakage, is set forth in Table 2 below:

TABLE 2

Comparison of Maximum Pressure Until Leakage (Experimental)

| Experimental Seal/Gasket | Maximum Pressure Until Leakage |
| --- | --- |
| Standardized Mechanical Joint Seal 300 | 120 psi |
| Experimental Embodiment of Gasket 25 of FIGS. 4A, 4B, and 4C | 500 psi |

As indicated in Table 2 above, the gasket 25 provided a maximum pressure that was over four (4) times that of the seal 300. This significant increase was an unexpected result. It was unknown whether there would be any improvement, much less a greater than expected result of over four (4) times improvement. For the gasket 25 to include protrusions that provide built-in offsets of upper dimension G (0.08 inches) and lower dimension M (0.08 inches), and to still provide a maximum pressure that was over four (4) times that of the seal 300, was an unexpected result. Previous seals or gaskets, such as the seal 300, have smooth upper and lower surfaces, with no built-in off-sets, to maximize respective contact areas of sealing engagement.

Figure 9:
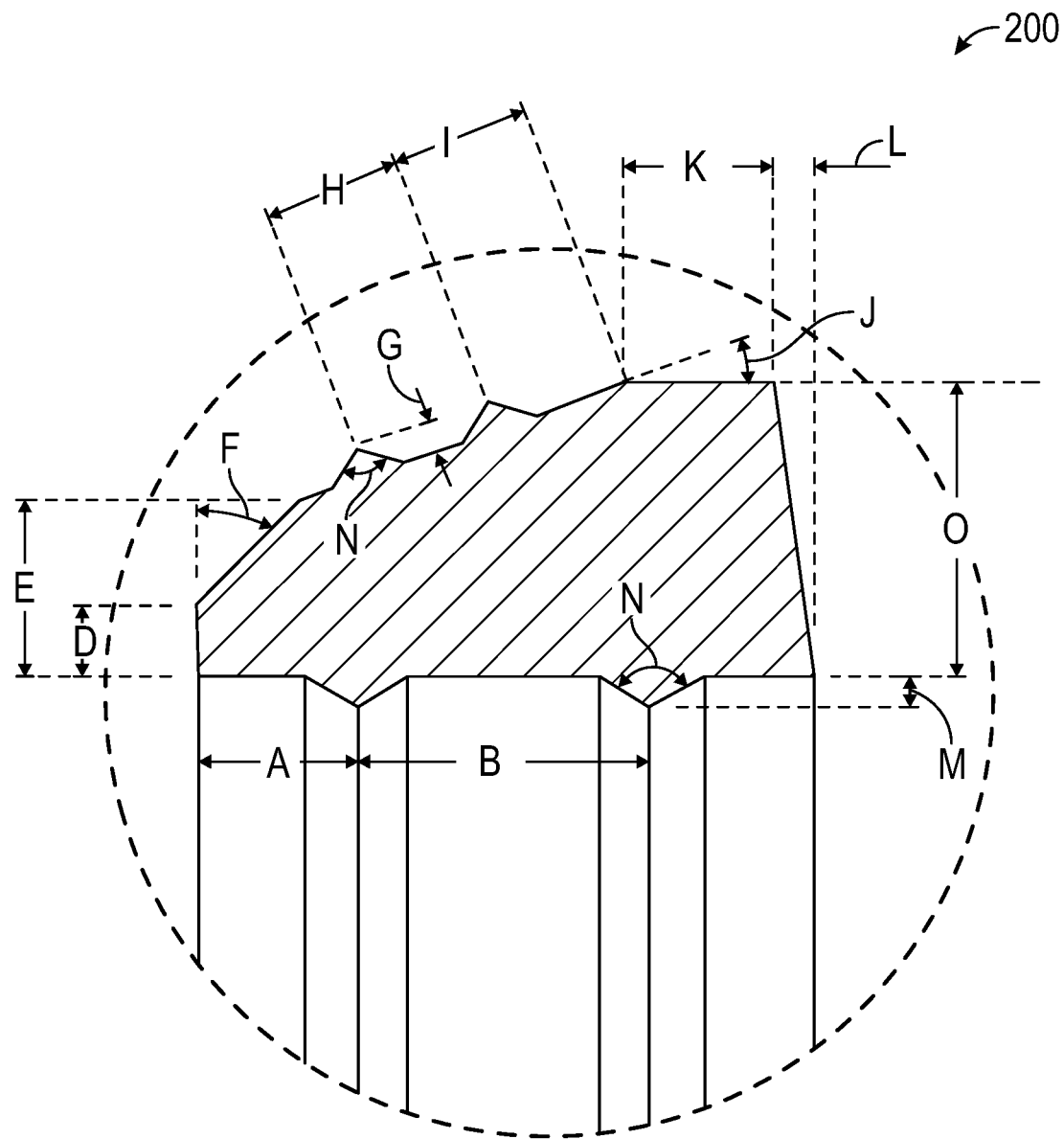
FIG. 9 is a cross-sectional view of the second embodiment of FIGS. 5A, 5B, and 5C, and is similar to that of FIG. 5C but indicates dimensions and angles without specific values thereof.

Using the above-described experimental test fixture and method, experimental testing was then conducted with an experimental embodiment of the gasket 200 of FIGS. 5A, 5B, and 5C. A dimensioned version of the experimental embodiment of the gasket 200 is illustrated in FIG. 9, which shows dimensions/angles (collectively "the dimensions") A-O. Unless otherwise shown in FIG. 9, the experimental embodiment of the gasket 200 of FIGS. 5A, 5B, and 5C has the same dimensions as those of the seal 300 illustrated in FIG. 7. The values of the dimensions A-O are set forth in Table 3 below:

TABLE 3

Dimensions/Angles of the Experimental Embodiment of Gasket 200

| Dimension/Angle | Value |
| --- | --- |
| A | 0.40 inches |
| B | 0.725 inches |
| C | Not Present |
| D | 0.18 inches |
| E | 0.43 inches |
| F | 45 degrees |
| G | 0.06 inches |
| H | 0.35 inches |
| I | 0.25 inches |
| J | 20 degrees |
| K | 0.38 inches |
| L | 0.10 inches |
| M | 0.09 inches |
| N | 110 degrees |
| O | 0.725 inches |

During the experimental testing, the gasket 200 provided a maximum pressure that was essentially the same as the maximum pressure provided by the gasket 25. Additional experimental tests were conducted with gaskets having profiles/cross-sections similar to the gasket 25, the gasket 200, or the gasket 250, with all tests providing maximum pressures on the order of the maximum pressure provided by the gasket 25.

Based on the foregoing experimental tests and their unexpected results, for the gasket 25, the gasket 200, the gasket 250, or another gasket having a profile/cross-section similar to the gasket 25, the gasket 200, or the gasket 250, at least the following combination of dimensions would provide similar unexpected results: the dimension A ranges from 0.30 inches to 0.40 inches; the dimension B ranges from 0.40 inches to 0.725 inches; the dimension G ranges from 0.06 inches to 0.08 inches; the dimension H ranges from 0.30 inches to 0.35 inches; the dimension I ranges from 0.20 inches to 0.30 inches; the dimension M ranges from 0.08 inches to 0.10 inches; and the angle N ranges from 90 degrees to 110 degrees.

Based on the foregoing experimental tests and their unexpected results, for the gasket 25, the gasket 200, the gasket 250, or another gasket having a profile/cross-section similar to the gasket 25, the gasket 200, or the gasket 250, at least the following combination of dimensions would provide similar unexpected results: the dimension A ranges from 0.30 inches to 0.40 inches; the dimension B ranges from 0.40 inches to 0.725 inches; the dimension D is 0.18 inches; the dimension E ranges from 0.41 inches to 0.44 inches; the angle F is 45 degrees; the dimension G ranges from 0.06 inches to 0.08 inches; the dimension H ranges from 0.30 inches to 0.35 inches; the dimension I ranges from 0.20 inches to 0.30 inches; the angle J is 20 degrees; the dimension K of the gasket 25 is 0.38 inches; the dimension L is 0.10 inches; the dimension M ranges from 0.08 inches to 0.10 inches; the angle N ranges from 90 degrees to 110 degrees; and the dimension O ranges from 0.71 inches to 0.73 inches.

In an example embodiment, the dimension A of the gasket 25 ranges from 0.25 inches to 0.45 inches. In an example embodiment, the dimension A of the gasket 25 ranges from 0.30 inches to 0.40 inches. In an example embodiment, the dimension A of the gasket 25 is 0.40 inches.

In an example embodiment, the dimension B of the gasket 25 ranges from 0.35 inches to 0.775 inches. In an example embodiment, the dimension B of the gasket 25 ranges from 0.40 inches to 0.725 inches. In an example embodiment, the dimension B of the gasket 25 is 0.40 inches.

In an example embodiment, the dimension C of the gasket 25 ranges from 0.35 inches to 0.45 inches. In an example embodiment, the dimension C of the gasket 25 is 0.40 inches.

In an example embodiment, the dimension D of the gasket 25 ranges from 0.13 inches to 0.23 inches. In an example embodiment, the dimension D of the gasket 25 is 0.18 inches.

In an example embodiment, the dimension E of the gasket 25 ranges from 0.38 inches to 0.49 inches. In an example embodiment, the dimension E of the gasket 25 ranges from 0.43 inches to 0.44 inches. In an example embodiment, the dimension E of the gasket 25 is 0.44 inches.

In an example embodiment, the angle F of the gasket 25 ranges from 40 degrees to 50 degrees. In an example embodiment, the angle F of the gasket 25 is 45 degrees.

In an example embodiment, the dimension G of the gasket 25 ranges from 0.05 inches to 0.09 inches. In an example embodiment, the dimension G of the gasket 25 ranges from 0.06 inches to 0.08 inches. In an example embodiment, the dimension G of the gasket 25 is 0.08 inches.

In an example embodiment, the dimension H of the gasket 25 ranges from 0.25 inches to 0.40 inches. In an example embodiment, the dimension H of the gasket 25 ranges from 0.30 inches to 0.35 inches. In an example embodiment, the dimension H of the gasket 25 is 0.30 inches.

In an example embodiment, the dimension I of the gasket 25 ranges from 0.20 inches to 0.35 inches. In an example embodiment, the dimension I of the gasket 25 ranges from 0.25 inches to 0.30 inches. In an example embodiment, the dimension I of the gasket 25 is 0.30 inches.

In an example embodiment, the angle J of the gasket 25 ranges from 15 degrees to 25 degrees. In an example embodiment, the angle J of the gasket 25 is 20 degrees.

In an example embodiment, the dimension K of the gasket 25 ranges from 0.33 inches to 0.43 inches. In an example embodiment, the dimension K of the gasket 25 is 0.38 inches.

In an example embodiment, the dimension L of the gasket 25 ranges from 0.05 inches to 0.15 inches. In an example embodiment, the dimension L of the gasket 25 is 0.10 inches.

In an example embodiment, the dimension M of the gasket 25 ranges from 0.075 inches to 0.095 inches. In an example embodiment, the dimension M of the gasket 25 ranges from 0.08 inches to 0.09 inches. In an example embodiment, the dimension M of the gasket 25 is 0.08 inches.

In an example embodiment, the angle N of the gasket 25 ranges from 85 degrees to 115 degrees. In an example embodiment, the angle N of the gasket 25 ranges from 90 degrees to 110 degrees. In an example embodiment, the angle N of the gasket 25 is 90 degrees.

In an example embodiment, the dimension O of the gasket 25 ranges from 0.675 inches to 0.78 inches. In an example embodiment, the dimension O of the gasket 25 ranges from 0.725 inches to 0.73 inches. In an example embodiment, the dimension O of the gasket 25 is 0.73 inches.

In an example embodiment, the dimension A of the gasket 200 ranges from 0.25 inches to 0.45 inches. In an example embodiment, the dimension A of the gasket 200 ranges from 0.30 inches to 0.40 inches. In an example embodiment, the dimension A of the gasket 200 is 0.40 inches.

In an example embodiment, the dimension B of the gasket 200 ranges from 0.35 inches to 0.775 inches. In an example embodiment, the dimension B of the gasket 200 ranges from 0.40 inches to 0.725 inches. In an example embodiment, the dimension B of the gasket 200 is 0.725 inches.

In an example embodiment, the dimension D of the gasket 200 ranges from 0.13 inches to 0.23 inches. In an example embodiment, the dimension D of the gasket 200 is 0.18 inches.

In an example embodiment, the dimension E of the gasket 200 ranges from 0.38 inches to 0.49 inches. In an example embodiment, the dimension E of the gasket 200 ranges from 0.43 inches to 0.44 inches. In an example embodiment, the dimension E of the gasket 200 is 0.43 inches.

In an example embodiment, the angle F of the gasket 200 ranges from 40 degrees to 50 degrees. In an example embodiment, the angle F of the gasket 200 is 45 degrees.

In an example embodiment, the dimension G of the gasket 200 ranges from 0.05 inches to 0.09 inches. In an example embodiment, the dimension G of the gasket 200 ranges from 0.06 inches to 0.08 inches. In an example embodiment, the dimension G of the gasket 200 is 0.06 inches.

In an example embodiment, the dimension H of the gasket 200 ranges from 0.25 inches to 0.40 inches. In an example embodiment, the dimension H of the gasket 200 ranges from 0.30 inches to 0.35 inches. In an example embodiment, the dimension H of the gasket 200 is 0.35 inches.

In an example embodiment, the dimension I of the gasket 200 ranges from 0.20 inches to 0.35 inches. In an example embodiment, the dimension I of the gasket 200 ranges from 0.25 inches to 0.30 inches. In an example embodiment, the dimension I of the gasket 200 is 0.25 inches.

In an example embodiment, the angle J of the gasket 200 ranges from 15 degrees to 25 degrees. In an example embodiment, the angle J of the gasket 200 is 20 degrees.

In an example embodiment, the dimension K of the gasket 200 ranges from 0.33 inches to 0.43 inches. In an example embodiment, the dimension K of the gasket 200 is 0.38 inches.

In an example embodiment, the dimension L of the gasket 200 ranges from 0.05 inches to 0.15 inches. In an example embodiment, the dimension L of the gasket 200 is 0.10 inches.

In an example embodiment, the dimension M of the gasket 200 ranges from 0.075 inches to 0.095 inches. In an example embodiment, the dimension M of the gasket 200 ranges from 0.08 inches to 0.09 inches. In an example embodiment, the dimension M of the gasket 200 is 0.09 inches.

In an example embodiment, the angle N of the gasket 200 ranges from 85 degrees to 115 degrees. In an example embodiment, the angle N of the gasket 200 ranges from 90 degrees to 110 degrees. In an example embodiment, the angle N of the gasket 200 is 110 degrees.

In an example embodiment, the dimension O of the gasket 200 ranges from 0.675 inches to 0.78 inches. In an example embodiment, the dimension O of the gasket 200 ranges from 0.725 inches to 0.73 inches. In an example embodiment, the dimension O of the gasket 200 is 0.725 inches.

In several example embodiments, the gasket 250 has dimensions/angles (collectively "the dimensions") that fall within the above-described ranges and/or values. In several example embodiments, the gasket 250's counterpart dimensions A, B, C, D, E, F, G, H, I, J, K, L, M, N, and O are 0.30 inches, 0.45 inches, 0.45 inches, 0.18 inches, 0.41 inches, 45 degrees, 0.070 inches, 0.35 inches, 0.20 inches, 20 degrees, 0.38 inches, 0.10 inches, 0.10 inches, 110 degrees, and 0.71 inches, respectively.

The present disclosure introduces a gasket adapted to be a part of a mechanical joint, the gasket including a ring-shaped body forming an opening, wherein the opening extends between a first end of the ring-shaped body and an opposing second end of the ring-shaped body; wherein the ring-shaped body has an inner surface adapted to engage a pipe; wherein the ring-shaped body has an outer surface that opposes the inner surface; wherein a first plurality of protrusions is formed on the body; and wherein the first plurality of protrusions is formed by the inner surface and extends toward a center of the opening. In one or more embodiments, the ring-shaped body forms an uninterrupted continuous ring. In one or more embodiments, a first protrusion of the first plurality of protrusions is spaced from the first end and the second end; and a second protrusion of the first plurality of protrusions is spaced from the first end and the second end. In one or more embodiments, each of the first protrusion and the second protrusion is V-shaped. In one or more embodiments, a second plurality of protrusions is formed on the body; and the second plurality of protrusions is formed by the outer surface and extends away from the opening. In one or more embodiments, the first plurality of protrusions has a first size; and the second plurality of protrusions has a second size that is different from the first size. In one or more embodiments, a first protrusion of the second plurality of protrusions is spaced from the first end and the second end; and a second protrusion of the second plurality of protrusions is spaced from the first end and the second end. In one or more embodiments, a portion of the outer surface is angled relative to the inner surface; and the second plurality of protrusions is located within the portion of the outer surface that is angled relative to the inner surface such that the second plurality of protrusions is also angled relative to the first plurality of protrusions.

The present disclosure also introduces a gasket adapted to be a part of a mechanical joint, the gasket including a ring-shaped body forming an opening, wherein the opening extends between a first end of the ring-shaped body and an opposing second end of the ring-shaped body; wherein the ring-shaped body has an inner surface adapted to engage a pipe; wherein the ring-shaped body has an outer surface that opposes the inner surface; wherein a first plurality of protrusions is formed on the body; and wherein the first plurality of protrusions is formed by the outer surface and extends away from a center of the opening. In one or more embodiments, the ring-shaped body forms an uninterrupted continuous ring. In one or more embodiments, a first protrusion of the first plurality of protrusions is spaced from the first end and the second end; and a second protrusion of the first plurality of protrusions is spaced from the first end and the second end. In one or more embodiments, each of the first protrusion and the second protrusion is V-shaped. In one or more embodiments, a second plurality of protrusions is formed on the body; and the second plurality of protrusions is formed by the inner surface and extends toward the center of the opening. In one or more embodiments, the first plurality of protrusions has a first size; and the second plurality of protrusions has a second size that is different from the first size. In one or more embodiments, a portion of the outer surface is angled relative to the inner surface; and the first plurality of protrusions is located within the portion of the outer surface that is angled relative to the inner surface such that the first plurality of protrusions is also angled relative to the second plurality of protrusions.

The present disclosure also introduces a mechanical joint, which includes a pipe; a bell; and a gasket engaging the pipe and the bell; wherein the gasket comprises a ring-shaped body; wherein the ring-shaped body has an inner surface engaging the pipe; wherein the ring-shaped body has an outer surface engaging the bell; wherein a first plurality of protrusions is formed by the inner surface and extends toward the pipe; and wherein a second plurality of protrusions is formed by the outer surface and extends towards the bell. In one or more embodiments, the first plurality of protrusions has a first size; and the second plurality of protrusions has a second size that is different from the first size. In one or more embodiments, a portion of the outer surface is angled relative to the inner surface; and the second plurality of protrusions is located within the portion of the outer surface that is angled relative to the inner surface such that the second plurality of protrusions is also angled relative to the first plurality of protrusions. In one or more embodiments, each of the first plurality of protrusions and the second plurality of protrusions is V-shaped. In one or more embodiments, an external surface of the pipe includes a series of channels between bumps; and wherein the first plurality of protrusions engages the series of channels to seal the gasket to the pipe.

It is understood that variations may be made in the foregoing without departing from the scope of the present disclosure.

In one or more embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In one or more embodiments, while different steps, processes, and procedures are described as appearing as distinct acts, one or more of the steps, one or more of the processes, and/or one or more of the procedures may also be performed in different orders, simultaneously and/or sequentially. In one or more embodiments, the steps, processes, and/or procedures may be merged into one or more steps, processes and/or procedures.

In one or more embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A gasket adapted to be a part of a mechanical joint, the gasket comprising:
    a ring-shaped body forming an opening, wherein the opening extends between a first end of the ring-shaped body and an opposing second end of the ring-shaped body;
    wherein the ring-shaped body has an inner surface adapted to engage a pipe;
    wherein the ring-shaped body has an outer surface that opposes the inner surface;
    wherein a first plurality of protrusions is formed on the body;
    wherein the first plurality of protrusions is formed by the inner surface and extends toward a center of the opening;
    wherein a first inner protrusion of the first plurality of protrusions is spaced from the first end and the second end;
        wherein the first inner protrusion defines a first inner peak;
    wherein a second inner protrusion of the first plurality of protrusions is spaced from the first end and the second end;
        wherein the second inner protrusion defines a second inner peak;
    wherein a dimension A is defined between the first inner peak and the first end;
    wherein the dimension A ranges from 0.30 inches to 0.40 inches;

wherein a dimension B is defined between the first inner peak and the second inner peak; and
wherein the dimension B ranges from 0.40 inches to 0.725 inches;
wherein a second plurality of protrusions is formed on the body;
wherein the second plurality of protrusions is formed by the outer surface and extends away from the opening;
wherein a first outer protrusion of the second plurality of protrusions defines a first outer peak;
wherein a second outer protrusion of the second plurality of protrusions defines a second outer peak;
wherein a dimension H is defined between the first outer peak and the second outer peak; and
wherein the dimension H ranges from 0.30 inches to 0.35 inches;
wherein a portion of the outer surface is angled relative to the inner surface;
wherein the angled portion of the outer surface defines an angle J relative to the inner surface;
wherein the second plurality of protrusions is located within the angled portion of the outer surface;
wherein the second outer protrusion is spaced from an end of the angled portion;
wherein a dimension I is defined between the second outer peak and the end of the angled portion;
wherein the dimension I ranges from 0.20 inches to 0.30 inches;
wherein the angle J ranges from 15 degrees to 25 degrees;
wherein another portion of the outer surface is angled relative to the first end;
wherein the another angled portion is located between the first end and the angled portion that defines the angle J;
wherein the another angled portion defines an angle F relative to the first end; and
wherein the angle F ranges from 40 degrees to 50 degrees.

2. The gasket of claim 1, wherein each of the first inner protrusion and the second inner protrusion is V-shaped thereby forming the first inner peak and the second inner peak, respectively;
wherein each of the first inner peak and the second inner peak forms an angle N;
wherein each of the angles N ranges from 90 degrees to 110 degrees;
wherein each of the first inner peak and the second inner peak defines a height and each of the heights defines a dimension M; and
wherein each of the dimensions M ranges from 0.08 inches to 0.10 inches.

3. The gasket of claim 1,
wherein each of the first outer protrusion and the second outer protrusion is V-shaped thereby forming a first outer peak and a second outer peak, respectively;
wherein each of the first outer peak and the second outer peak defines a height and each of the heights defines a dimension G; and
wherein each of the dimensions G ranges from 0.06 inches to 0.08 inches.

4. The gasket of claim 1,
wherein each of the first inner protrusion and the second inner protrusion is V-shaped thereby forming the first inner peak and the second inner peak, respectively;
wherein each of the first inner peak and the second inner peak forms an angle N;
wherein each of the angles N ranges from 90 degrees to 110 degrees;
wherein each of the first inner peak and the second inner peak defines a height and each of the heights defines a dimension M; and
wherein each of the dimensions M ranges from 0.08 inches to 0.10 inches;
wherein each of the first outer protrusion and the second outer protrusion is V-shaped thereby forming a first outer peak and a second outer peak, respectively;
wherein each of the first outer peak and the second outer peak defines a height and each of the heights defines a dimension G;
and
wherein each of the dimensions G ranges from 0.06 inches to 0.08 inches.

5. A gasket adapted to be a part of a mechanical joint, the gasket comprising:
a ring-shaped body forming an opening, wherein the opening extends between a first end of the ring-shaped body and an opposing second end of the ring-shaped body;
wherein the ring-shaped body has an inner surface adapted to engage a pipe;
wherein the ring-shaped body has an outer surface that opposes the inner surface;
wherein a first plurality of protrusions is formed on the body;
wherein the first plurality of protrusions is formed by the inner surface and extends toward a center of the opening;
wherein a first inner protrusion of the first plurality of protrusions is spaced from the first end and the second end;
wherein the first inner protrusion defines a first inner peak;
wherein a second inner protrusion of the first plurality of protrusions is spaced from the first end and the second end;
wherein the second inner protrusion defines a second inner peak;
wherein a dimension A is defined between the first inner peak and the first end;
wherein a dimension B is defined between the first inner peak and the second inner peak; and
wherein the dimension B is equal to, or greater than, the dimension A;
wherein a second plurality of protrusions is formed on the body;
wherein the second plurality of protrusions is formed by the outer surface and extends away from the opening;
wherein a first outer protrusion of the second plurality of protrusions defines a first outer peak;
wherein a second outer protrusion of the second plurality of protrusions defines a second outer peak;
wherein a dimension H is defined between the first outer peak and the second outer peak; and
wherein a portion of the outer surface is angled relative to the inner surface;
wherein the angled portion of the outer surface defines an angle J relative to the inner surface;
wherein the second plurality of protrusions is located within the angled portion of the outer surface;
wherein the second outer protrusion is spaced from an end of the angled portion;
wherein a dimension I is defined between the second outer peak and the end of the angled portion;
wherein the dimension I is less than, or equal to, the dimension H;

wherein another portion of the outer surface is angled relative to the first end;
wherein the another angled portion is located between the first end and the angled portion that defines the angle J;
wherein the another angled portion defines an angle F relative to the first end; and
wherein the angle F is greater than the angle J.

6. The gasket of claim 5,
wherein each of the first inner protrusion and the second inner protrusion is V-shaped thereby forming the first inner peak and the second inner peak, respectively;
wherein each of the first inner peak and the second inner peak forms an angle N;
wherein each of the angles N is greater than the angle F; and
wherein each of the first inner peak and the second inner peak defines a height and each of the heights defines a dimension M.

7. The gasket of claim 6,
wherein each of the first outer protrusion and the second outer protrusion is V-shaped thereby forming a first outer peak and a second outer peak, respectively;
wherein each of the first outer peak and the second outer peak defines a height and each of the heights defines a dimension G; and
wherein each of the dimensions G is equal to, or less than, each of the dimensions M.

* * * * *